United States Patent
Arth et al.

(10) Patent No.: US 10,163,224 B2
(45) Date of Patent: Dec. 25, 2018

(54) IMAGE PROCESSING METHOD, MOBILE DEVICE AND METHOD FOR GENERATING A VIDEO IMAGE DATABASE

(71) Applicant: AR4 GmbH, Graz (AT)

(72) Inventors: Clemens Arth, Gratwein-Strassengel (AT); Philipp Fleck, Graz (AT); Denis Kalkofen, Graz (AT); Peter Mohr, Graz (AT); Dieter Schmalstieg, Graz (AT)

(73) Assignee: AR4 GMBH, Graz (AT)

( * ) Notice: Subject to any disclaimer, the term of this patent is extended or adjusted under 35 U.S.C. 154(b) by 31 days.

(21) Appl. No.: 15/428,673

(22) Filed: Feb. 9, 2017

(65) Prior Publication Data

US 2017/0236302 A1    Aug. 17, 2017

(30) Foreign Application Priority Data

Feb. 11, 2016   (EP) ..................................... 16155201
Jun. 1, 2016    (EP) ..................................... 16172479

(51) Int. Cl.
*G06K 9/00*    (2006.01)
*G06T 7/73*    (2017.01)
(Continued)

(52) U.S. Cl.
CPC .......... *G06T 7/74* (2017.01); *G06F 17/30784* (2013.01); *G06F 17/30858* (2013.01);
(Continued)

(58) Field of Classification Search
CPC . G06T 7/74; G06T 7/248; G06T 2207/10016; G06T 2207/30244; H04N 5/272; G06F 17/30784; G06F 17/30858
(Continued)

(56) References Cited

U.S. PATENT DOCUMENTS

| 5,532,833 A   | * | 7/1996 | Hong | ................ G06F 17/30858 |
| | | | | 348/E7.071 |
| 2007/0030391 A1 | * | 2/2007 | Kim | ................... G06K 9/00751 |
| | | | | 348/564 |

(Continued)

FOREIGN PATENT DOCUMENTS

| WO | 2009/079809 A1 | 7/2009 |
| WO | 2016/050290 A1 | 4/2016 |

OTHER PUBLICATIONS

Fuhrmann, Anton, et al. "Collaborative Visualization in Augmented Reality." Visualization Case Studies. Jul./Aug. 1998, 6 pages.
(Continued)

*Primary Examiner* — Gregory F Cunningham
(74) *Attorney, Agent, or Firm* — Eschweiler & Potashnik, LLC

(57) ABSTRACT

For an image processing concept, a database including data derived from a plurality of frames of a video is provided in a device. A live video feed is obtained from a camera of the device. Information is extracted from an image of the video feed. A search is performed in the database using the extracted information to retrieve a list of potential frames out of the plurality of frames. An initial pose of the selected image is estimated with respect to one frame of the list as a function of the extracted information and the data derived from the one frame. Respective subsequent poses for subsequent images from the live video feed are iteratively estimated, wherein the associated subsequent pose is estimated based on said subsequent image and a respective previously estimated pose. The video feed is augmented on the device with virtual information based on the estimated initial pose and the subsequent poses.

15 Claims, 4 Drawing Sheets

(51) Int. Cl.
  G06T 7/246 (2017.01)
  G06F 17/30 (2006.01)
  H04N 5/272 (2006.01)
  G06K 9/32 (2006.01)
  G06T 7/20 (2017.01)
  G06K 9/22 (2006.01)

(52) U.S. Cl.
  CPC .............. *G06K 9/3208* (2013.01); *G06T 7/20* (2013.01); *G06T 7/248* (2017.01); *H04N 5/272* (2013.01); *G06K 9/228* (2013.01); *G06T 2207/10016* (2013.01); *G06T 2207/30244* (2013.01)

(58) Field of Classification Search
  USPC .......................................................... 382/103
  See application file for complete search history.

(56) References Cited

U.S. PATENT DOCUMENTS

| | | | | |
|---|---|---|---|---|
| 2013/0336590 | A1* | 12/2013 | Sentinelli | H04N 5/772 382/218 |
| 2014/0044361 | A1* | 2/2014 | Lee | G06K 9/6211 382/201 |
| 2014/0111662 | A1* | 4/2014 | Mashiah | G06T 13/80 348/220.1 |
| 2016/0189425 | A1* | 6/2016 | Li | G11B 27/105 345/633 |
| 2017/0329769 | A1* | 11/2017 | Berg | G06F 17/3002 |

OTHER PUBLICATIONS

Wagner, Daniel et al. "Pose Tracking from Natural Features on Mobile Phones." IEEE International Symposium on Mixed and Augmented Reality, Sep. 16-18, 2008. Cambridge, UK. 10 pages.

Rosten, Edward, et al. "Fusing Points and Lines for High Performance Tracking." Proceedings of the Tenth IEEE International Conference on Computer Vision (ICCV'05). 8 pages.

Reitmayr, Gerhard et al. "Going out; Robust Model-based Tracking for Outdoor Augmented Reality." IEEE. 2006, 10 pages.

Agarwal, Anubhav et al, "A Survey of Planar Homography Estimation Techniques." Centre for Visual Information Technology, International Institute of Information Technology. 25 pages.

Arya, Sunil et al. "An Optimal Algorithm for Approximate Nearest Neighbor Searching in Fixed Dimensions." Journal of the ACM, vol. 45, No. 6, Nov. 1998, 33 pages.

Bay, Herbert et al. "Speeded-Up Robust Features (SURF)." ScienceDirect, Computer Vision and Image Understanding 110 (2008). 14 pages.

Celozzi, Cesare et al. "Enabling Human-Machine Interaction in Projected Virtual Environments Through Camera Tracking of Imperceptible Markers," Intl. Journal of Human-Computer Interaction, 29: 549-561, 2013.

Hartl, Andreas et al. "Client-side Mobile Visual Search." Institute for Computer Graphics and Vision, Graz University of Technology. Inffeldgasse 16, Graz, Austria. 8 pages.

Horn, Berthold K.P. et al. "Determining Optical Flow," Artificial Intelligence, 19 pages.

Lowe, David G, "Distinctive Image Features from Scale-Invariant Keypoints," International Journal of Computer Vision, 2004. 28 pages.

Lucas, Bruce D. et al. "An Iterative Image Registration Technique with an Application to Stereo Vision." Proc 7th Intl Joint Conf on Artificial Intelligence (IJCAI) 1981, Aug. 24-28, Vancouver, British Columbia. 12 pages.

Nistér, David et al, "Scalable Recognition with a Vocabulary Tree." Center for Visualization and Virtual Environments, Department of Computer Science, University of Kentucky, 8 pages.

Schweighofer, Gerald et at "Robust Pose Estimation from a Planar Target." Graz University of Technology—Technical Report, TR-EMT-2005-01 (May 13, 2005) (Submitted to IEEE[PAMI] May 2005). 9 pages.

Sivic, Josef et al. "Video Google: A Text Retrieval Approach to Object Matching in Videos." Proceedings of the Ninth IEEE International Conference on Computer Vision (ICCV 2003) 2-Volume Set. 8 pages.

Zach, C. et al, "A Duality Based Approach for Realtime TV-L1 Optical Flow." VRVis Research Center, Institute for Computer Graphics and Vision, TU Graz. 10 pages.

* cited by examiner

IMAGE PROCESSING METHOD, MOBILE DEVICE AND METHOD FOR GENERATING A VIDEO IMAGE DATABASE

CROSS REFERENCE TO RELATED APPLICATIONS

This application claims priority to European Application number 16155201.3 filed on Feb. 11, 2016 and European Application number 16172479.4 filed on Jun. 1, 2016, the contents of which are incorporated by reference in their entirety.

FIELD

The present disclosure is related to an image processing method for live video images, particularly in a mobile device, to a mobile device and to a method for generating a video image database.

BACKGROUND

Placing advertisements in public environments is a multi-billion dollar business. Traditional advertising is based on placing large billboards over highways, next to streets, or just in shop-floor windows.

Due to the digital disruption of our everyday's life, the trend in advertising goes from placing big static posters and large billboards to installing fully digital screens and flexible and interactive displays. This gives rise to new and interesting opportunities using Augmented Reality (AR) to bring the actual advertising content to life and to engage the observer.

AR visualizes virtual information, which is registered with respect to the given environment, in the real view of the observer as seen through devices like head-mounted displays (HMDs), or through smartphones treated as "magic lenses", using the back-facing camera.

Registration is essential and denotes the knowledge of a pose of a camera of the device with respect to a known asset in the real world. 'Pose' denotes the position and orientation of a camera in 6 degrees of freedom (3 for the translation, x, y, z, and 3 for the rotation, pan, tilt, roll) with respect to a given environment, i.e. in this case a 2D planar target. The pose is usually denoted as a 3×4 matrix P.

To estimate the pose of a camera with respect to a known static 2D target, several approaches are known from the literature. A well-known algorithm is to capture the target appearance through local visual features, extracting them from the live image and comparing those local visual features to a set of features previously extracted from the given template.

Approaches to be used for feature extraction are Scale-Invariant Feature Transform (SIFT) as described in D. G. Lowe. Distinctive image features from scale-invariant keypoints. *Int. J. Comput. Vision*, 60(2):91-110, November 2004, or Speeded-Up Robust Features (SURF) as described in H. Bay, A. Ess, T. Tuytelaars, and L. Van Gool. Speeded-up robust features (surf). *Comput. Vis. Image Underst.*, 110(3):346-359, June 2008, for example. Feature matching is facilitated through exhaustive or approximated methods, which is discussed in S. Arya, D. M. Mount, N. S. Netanyahu, R. Silverman, and A. Y. Wu. An optimal algorithm for approximate nearest neighbor searching fixed dimensions. *J. ACM*, 45(6):891-923, November 1998.

Image retrieval or video indexing approaches use this technique for rapid retrieval of images or frames of interest, discussed e.g. in D. Nister and H. Stewenius. Scalable recognition with a vocabulary tree. In *Proceedings of the 2006 IEEE Computer Society Conference on Computer Vision and Pattern Recognition—Volume 2*, CVPR '06, pages 2161-2168, Washington, D.C., USA, 2006. IEEE Computer Society. However, pose estimation is disclaimed.

A method to identify a target from a database of previously known 2D targets on mobile devices was shown in A. Hartl, D. Schmalstieg, and G. Reitmayr. Client-side mobile visual search. In *VISAPP 2014—Proceedings of the 9th International Conference on Computer Vision Theory and Applications, Volume 3*, Lisbon, Portugal, 5-8 Jan., 2014, pages 125-132, however, without calculating a pose after identification.

To perform pose estimation for 2D targets in general, algorithms leveraging the planarity assumption can be employed, as e.g. discussed in G. Schweighofer and A. Pinz. Robust pose estimation from a planar target. *IEEE Transactions on Pattern Analysis and Machine Intelligence*, 28(12):2024-2030, 2006. Such algorithms estimate the pose P, which correctly projects real-world 3D points into their 2D image coordinates, using $$x_i = K \cdot P \cdot (_1 x_w) \quad (1)$$

where K is a 3×3 calibration matrix describing the internal camera characteristics, xw is a 3×1 vector describing a 3D world point, xi is a 3×1 vector describing the projection in the image space.

The 2D image coordinate (x,y) is finally given by $$x = xi(1)/xi(3), \; y = xi(2)/xi(3)). \quad (2)$$

Detecting and tracking a 2D target in images is an already well-understood problem. However, approaches leverage the static nature of the 2D targets and do not take into account any modifications during runtime.

For video streams, basically every frame is different, changing rapidly at 25-50 Hz. This means that any algorithm has to detect and track the corresponding frame within a very limited amount of time, e.g. within 20-40 ms. Detecting and tracking dynamic 2D targets, like in video sequences, hence requires huge computational effort with conventional techniques.

SUMMARY

The present disclosure provides an improved image processing concept, which allows efficient processing of live video feeds.

The improved image processing concept is based on the idea that instead of storing each frame of a video sequence to be processed, only data derived from a plurality of frames of the video sequence are stored in a database. Moreover, it may be sufficient to use only selected frames of the video sequence as a basis for the data to be stored in the database. These data for example contain information about particular properties of each of the analyzed frames and an index for associating said information to a particular one of the plurality of frames. Such database may be prepared in advance. In an example AR application, images of a live video feed are taken and analyzed for extracting information that can be used to index into the database in order to find a match between the image of the live video feed and one of the frames in the database. This match can be used to estimate an initial pose between a camera of the live video feed and the frame in the database. For subsequent images of the live video feed the initial pose estimation can be used for adapting the pose and iteratively estimate corresponding subsequent poses. All of these pose estimates are the basis for augmentation of the live video feed with an additional information.

If a pose is estimated for the first time, this process is commonly referred to as 'initialization'. If, for continuous image streams (i.e. videos), the pose information from the previous frame is used to estimate the new pose of the current frame, this is commonly called 'tracking'.

The improved image processing concept for example deals with the real-time estimation of the pose of a camera with respect to a dynamically changing 2D target, i.e. a video screen, employing initialization and subsequent tracking. To track dynamic 2D targets like video screens requires continuously estimating the pose of the displays on a frame-by-frame basis.

However, the amount of data to be stored within the database is reasonable, as it is not mandatory that each and every image has to be indexed separately.

The improved image processing concept hence enables the use of Augmented Reality to annotate digital video content on the fly right in front of the display on consumer mobile devices.

In example implementations, given a device, in particular a mobile device, equipped with a camera and a database of information about a set of two-dimensional, 2D, targets, respectively images or frames, as a prerequisite, for an actual camera view of a scene with some target present, the dedicated target, respectively its image, is identified from this database and a corresponding index to the associated frame is returned.

Given the index of the corresponding frame, information about geometric properties of the original frame in the database can be used to estimate the position and orientation, collectively referred to as 'pose', of the camera with respect to the scene.

Having a pose estimate, the pose may be further improved by some optimization on a specific error measure.

Having identified the camera pose with respect to a frame, the time taken for estimation may be considered in case of the targets changing appearance and shape in successive frames, like in a video. To maintain a robust and stable pose estimate over successive frames through tracking, for such a dynamic target a method to cope with the changes in appearance may be employed.

Given the pose calculated for a dynamic target, virtual information is presented to the user by means of Augmented Reality.

In an example embodiment of the improved image processing concept, and image processing method comprises providing, in a device, a database comprising data derived from a plurality of frames of a video sequence. A live video feed is obtained from a camera of the device. Information is extracted from a selected image of the live video feed. A search is performed in the database based on the extracted information to retrieve a list of potential frames out of the plurality of frames. An initial pose of the selected image is estimated with respect to one frame of the list of potential frames as a function of the extracted information and the data derived from the one frame. Respective subsequent poses for subsequent images from the live video feed are iteratively estimated, wherein for each of the subsequent images the associated subsequent pose is estimated based on said subsequent image and a respective previously estimated pose. The live video feed is augmented on the device with virtual information based on the estimated initial pose and the subsequent poses.

For example, estimating the initial pose comprises testing the frames of the list of potential frames for valid starting poses until the one frame is identified. In other words, if no reasonable pose or no polls at all can be determined for the tested frame in the list of potential frames, the next potential frame in the list is tested. For example, a pose is believed not to be reasonable, if it was outside the viewing range of the camera like behind the camera.

A hypothesis for one pose may be formed from a limited set of associations between the selected image and the frame under test. The hypothesis may then be tested for further associations until proven to be true.

In some implementations, the initial pose is estimated using two-dimensional visual correspondences between the selected image of the live video feed and the data derived from the one frame. The correspondences may be defined by various kinds of meta-descriptors or features, e.g. derived by edge detection techniques applied to the frames, together with their 2-D position within the frame. For example, approximately 100 to 1000 features may be stored or derived for each frame.

The processing techniques may be similar during generation of the database and evaluation of the live video feed. For example, the data derived from the plurality of frames contain two-dimensional local visual features and their two-dimensional position for each of the plurality of frames, particularly organized in a structure for fast indexing. The data derived from the plurality of frames may contain global appearance information for each of the plurality of frames, as an alternative or in addition. Furthermore, as an alternative or in addition, the data derived from the plurality of frames may contain semantic scene descriptions. For example, such semantic scene descriptions could carry information about the objects/actors and the respective meaning of the scene depicted in the respective frame. An example for semantic scene descriptions could be the description of a specific number of people standing in the image at a specific position or in a specific, geometrical distribution, or the like. Also information about color, lighting conditions are the like can be contained in the semantic description. Semantic image understanding is one major topic of research using convolutional neural networks, CNNs, to learn the appearance of objects in images and to assign semantic meaning to individual areas of an image.

In addition or as an alternative, the initial pose is estimated through whole image alignment and minimization of a dedicated error function.

In various implementations, the plurality of frames are key frames of an MPEG movie and wherein the database further comprises motion field information for frames in between the key frames. The motion field information may be used for the iterative estimation of the respective subsequent poses. For example, identified features may be tracked using the motion field information. The motion field information may be directly derived from the original MPEG movie, if the respectively used codec provides such information for reconstructing frames in between key frames. In various implementations, the data derived from the plurality of frames contain global appearance information for each of the plurality of frames.

In some implementations, the iterative estimation of the respective subsequent poses is facilitated using Optical Flow or Lucas-Kanade based tracking.

In addition or as an alternative, the iterative estimation of the respective subsequent poses may also be facilitated considering motion undertaken by local patches associated with the extracted information. To track small local patches in consecutive frames, a method considering corner information can be used, originally presented in B. D. Lucas and T. Kanade. An iterative image registration technique with an application to stereo vision. In *Proceedings of the 7th International Joint Conference on Artificial Intelligence—Volume* 2, IJCAI'81, pages 674-679, San Francisco, Calif., USA, 1981. The locality of information does not imply any constraints on the geometric nature of the scene observed (i.e. without implying additional constraints like planarity or rigidity, inferring the pose of a target in the scene is not possible).

In various implementations, the initial pose is refined by means of optimization as a function of the extracted information and the data derived from the one frame. For example, the pose optimization is facilitated using non-linear refinement using the reprojection error of 2D target features in the actual image plane.

In various implementations, a visualization engine is used to accurately annotate virtual content onto a screen of the device.

The device may be a standard mobile consumer hardware like one of the following: a mobile phone, a tablet, a portable PC, a Head-Mounted Display, HMD, a data glass (e.g. Google Glass), a mobile device. The device may contain one or more device sensors including a satellite positioning system. Positioning information gathered from the satellite positioning system may be used to identify potential video sequences around the device and for downloading and associated database carrying the data of such potential video sequence.

Consequently, an example implementation of a mobile device according to the improved image processing concept comprises a processing unit, a camera and a memory, the memory holding a database comprising data derived from a plurality of frames of a video sequence. The processing unit is configured to carry out the implementation steps described above for the various examples of the image processing method.

An example implementation of a method for generating a video image database according to the improved concept comprises deriving data from a plurality of frames of a video sequence, and storing the data in the video image database together with a reference to the respectively associated frame. For example, the data derived from the plurality of frames contain two-dimensional local visual features and their two-dimensional position for each of the plurality of frames, particularly organized in a structure for fast indexing.

For example, the information extracted for each of the plurality of frames is a global appearance based representation. Furthermore, as an alternative or in addition, the information extracted for each of the plurality of frames may contain semantic scene descriptions. An indexing structure of the database may be based on an approximate nearest neighbor search.

Further options for the database generation method become apparent from the discussion of the image processing method and its example implementations.

In one exemplary implementation, from a set of images or video frames (collectively referred to as 'targets'), a database is created in advance, that stores the information of these images and contains a mechanism to retrieve the corresponding information for a certain one rapidly on request. Local visual features of this set of targets or video frames are extracted and organized in a database with a fast indexing structure. Also the 2D position of the local visual features within the individual images is stored in the database. The database is transferred to the mobile device as part of a larger application package. The ID of a 2D target observed is retrieved by voting, based on the count of occurrences of similar features observed in the actual camera view. The result is a ranked list of 2D targets likely to be present in the actual scene. The pose from the first 2D target in the list is calculated by leveraging the planarity assumption, and robustly solving an equation system, which is established from the actual 2D measurements in the image and 2D world points from the target as stored in the database (i.e. putting the 2D world points from the target into Eq. (1) should give the 2D measurements; P is unknown and is to be estimated). If the pose estimation fails, the next 2D target from the list is considered, up to a maximum number, until estimation succeeds, or aborting the overall process otherwise. The pose refinement is performed on the reprojection error of the matched 2D features from the target into the image plane, through the use of non-linear optimization, based on Eq. (1) and Eq. (2) and minimizing the Euclidean distance of the projected points $x_i$ to the actual measurements $x'_i$. For successive frames, the 2D positions of features matched previously in pose estimation are tracked through the use of optical flow. The updated pose is calculated by leveraging the planarity assumption and robustly solving an equation system created by the tracked 2D observations and the 2D target features, considering the motion undertaken by the individual features in the 2D image plane. The pose is finally used to annotate virtual content registered accurately onto the device display.

In another exemplary implementation, the electronic devices are standard mobile consumer hardware, like mobile phones or tablets, or even portable PCs, HMDs or data glasses (e.g. Google Glass). A global representation of a set of I-frames from an MPEG video is extracted and organized in a database in advance with a fast indexing structure, together with the motion vector fields from MPEG for the frames in between the I-frames. The database is transferred over wired connection to the mobile device. The ID of an observed 2D target is retrieved by matching the global representations from the database to the representation in the actual camera view. The result is a ranked list of 2D targets likely to be present in the actual scene. The pose from the first 2D target in the list is calculated by leveraging the planarity assumption, and robustly solving an equation system, which is established through a process of whole image alignment and minimization of a dedicated error function. If the pose estimation fails, the next 2D target is considered, up to a maximum number, until estimation succeeds, or aborting the overall process otherwise. For successive frames, distinctive patches are tracked through the use of motion vector fields as stored in the database. The updated pose is calculated by leveraging the planarity assumption and robustly solving an equation system created by the distinctive patches and the undertaken motion in the 2D image plane. The pose is finally used to annotate virtual content registered accurately onto the device display.

In another exemplary implementation as described above, the database is transferred to a mobile device wirelessly, like through automatic WIFI connection, e.g. to a public hotspot in shopping malls.

In another exemplary implementation as described above, the database is offered for download through geo-fencing, i.e., noting the GPS position of a user and offering databases for download based on the approximate position on the globe.

For the technical implementation of some of the aspects described above, the skilled person is referred to the explanations in the BACKGROUND section. The references cited therein are incorporated into the present disclosure in their entirety.

BRIEF DESCRIPTION OF THE DRAWINGS

For a more complete understanding of the improved image processing concept, reference is made to the following description and accompanying drawings, in which.

DETAILED DESCRIPTION

Figure 1:
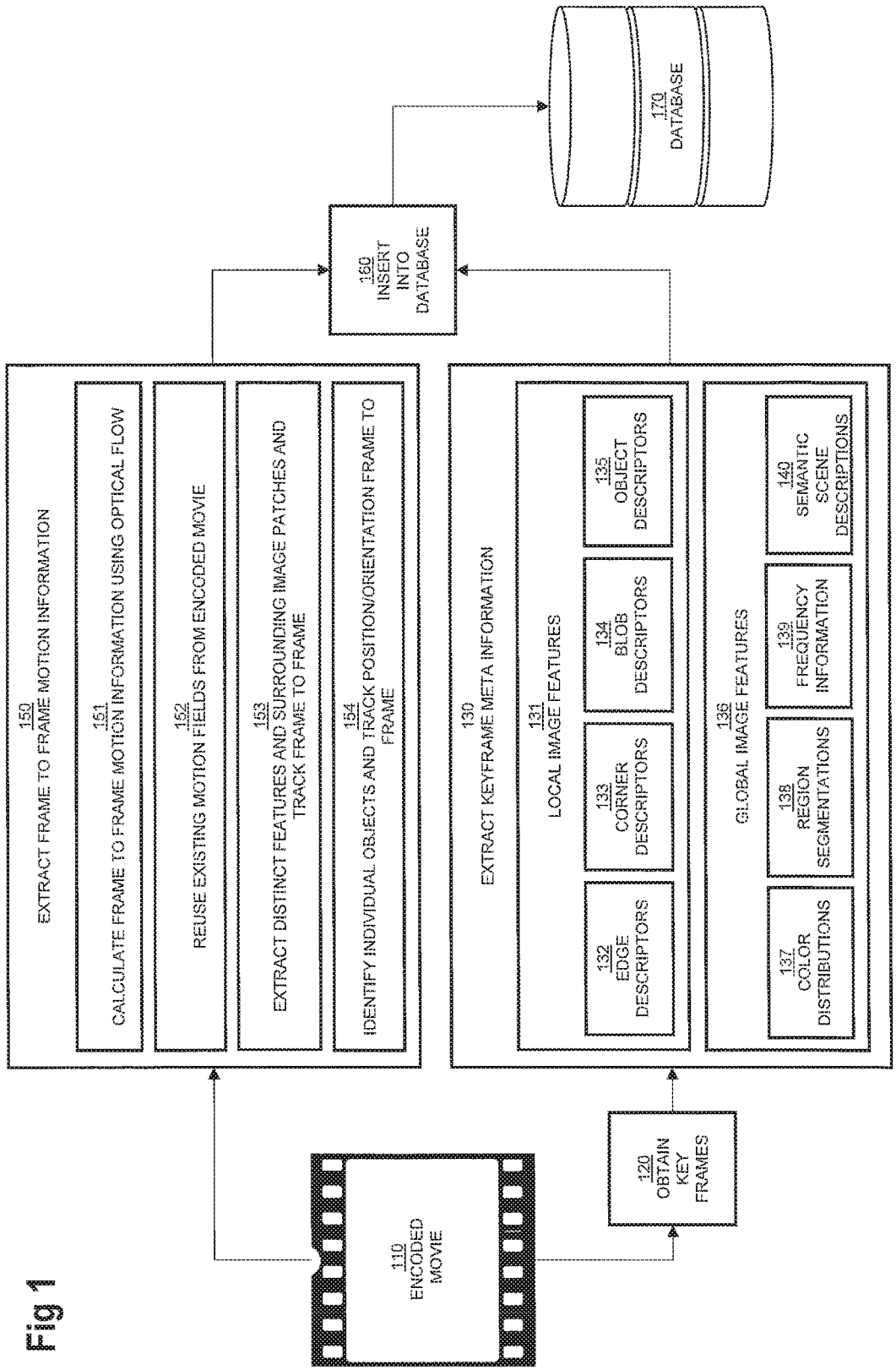
FIG. 1 illustrates the creation of the database.

In FIG. 1, an exemplary implementation of a database creation according to the improved image processing concept based on a movie is depicted. Given an encoded movie 110, individual key frames are extracted from the movie in block 120. For each individual key frame, meta information or similar data are extracted in block 130, capturing either local image features 131, global image features 136, or a combination of both.

Local features 131 may contain, but are not limited to, for example edge features 132 and descriptors thereof, corner features 133 and descriptors thereof, blob-like structures 134 and descriptors thereof, or descriptors 135 of objects/actors contained, their position and orientation.

Global image features 136 may contain, but are not limited to, for example color distributions 137, segmentations into regions 138, frequency histograms or statistics 139, or even semantic scene descriptions 140 about the objects/actors and the respective meaning of the scene depicted. Generally speaking, the data derived from the plurality of frames can contain two-dimensional local visual features and their two-dimensional position for each of the plurality of frames, particularly organized in a structure for fast indexing.

An example for semantic scene descriptions could be the description of a specific number of people standing in the image at a specific position or in a specific, geometrical distribution, or the like. Also information about color, lighting conditions are the like can be contained in the semantic description.

Semantic image understanding is one major topic of research using convolutional neural networks, CNNs, to learn the appearance of objects in images and to assign semantic meaning to individual areas of an image, as described for example in: Jonathan Long and Evan Shelhamer and Trevor Darrell: Fully Convolutional Networks for Semantic Segmentation; Conference on Computer Vision and Pattern Recognition (CVPR), 2015.

Frame to frame motion information is likewise extracted in block 150. Options may include, but are not limited to, the frame-to-frame motion information based on Optical Flow in block 151, reusing existing motion field information from the movie encoder in block 152, distinct visual features like corners and surrounding image patches tracked across frames in block 153, and the identification of objects/actors and tracking their position and orientation across frames in block 154. For example, the frames underlying the database 170 are key frames of an MPEG movie and the database 170 further comprises motion field information for frames in between the key frames. The meta information 130 and the frame to frame motion information 150 is inserted into the database 170 in block 160.

It should be noted that the type of information extracted in blocks 130 and 150 may vary from frame to frame, depending e.g. on the actual content of the frame to be analyzed.

Figure 2:
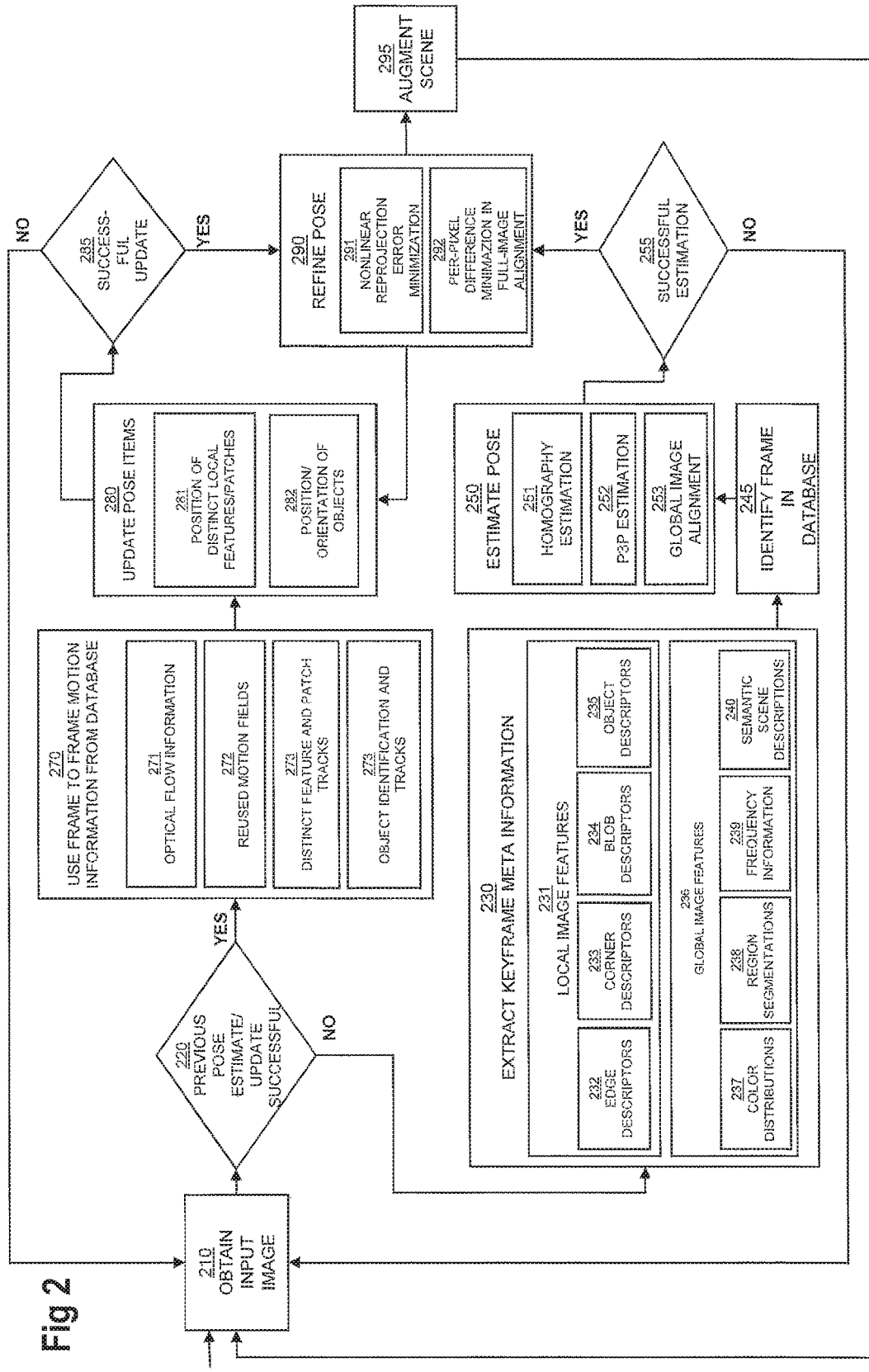
FIG. 2 illustrates the overall framework.

In FIG. 2, an exemplary framework for pose estimation and augmentation is depicted. First, a new frame is obtained in block 210 from a camera of a device, e.g. a mobile device. If there is no previous frame pose available in block 220, we extract the image metadata 230 from the current frame in analogy to FIG. 1, block 130, capturing either local image features 231, global image features 236, or a combination of both. More generally speaking, a similar analysis as in block 130 may be performed in block 230, wherein computational resources of the device may be taken into account. In particular, the computational effort of the analysis may be adapted to the abilities of the device respectively its processor.

Local features 231 are for example edge features 232 and descriptors thereof, corner features 233 and descriptors thereof, blob-like structures 234 and descriptors thereof, or descriptors of objects/actors 235 contained, their position and orientation. Global image features 236 are for example color distributions 237, segmentations into regions 238, frequency histograms or statistics 239, or even semantic scene descriptions 240 about the objects/actors and the respective meaning of the scene depicted, to name some but not all possible options. With respect to the semantic scene descriptions 240, it is referred to the description there off for FIG. 1. It should be apparent to the skilled person that the meta information extracted in block 230 should finally match to the data stored in the database 170.

Using this information extracted from the input image, one or more potential corresponding frames in the database 170 are identified in block 245. Corresponding database requests may make use of fast indexing technologies.

We subsequently estimate the initial pose of the current frame in block 250 with respect to the frame retrieved from the database 170, by using, for example, homography estimation 251 on individual distinct features, or Perspective-Three-Point, P3P, pose estimation 252 on distinct features, or global image alignment 253. Homography estimation 251 is e.g. discussed in above referenced G. Schweighofer and A. Pinz, Robust pose estimation from a planar target. *IEEE Transactions on Pattern Analysis and Machine Intelligence*, 28(12):2024-2030, 2006. P3P pose estimation 252 may use well known RANSAC algorithms. Generally speaking, the initial pose is estimated using two-dimensional visual correspondences between the selected image or frame of the live video feed and the data stored for the one frame identified in the database 170. This may be done through whole image alignment and minimization of a dedicated error function.

On success in block 255, the initial pose may be further refined using optimization methods 290, containing for example non-linearly minimizing the distinct feature re-projection error in block 291, or pixel-by-pixel differencing and minimization of the sum of per-pixel differences using full-image alignment in block 292. However, application of block 290 for refining the initial pose can also be left out.

Finally, the frame is augmented with virtual information in block 295. An example of such augmentation will be given below in conjunction with the description of FIG. 3.

Given a new frame in block 210 and the previous pose estimate in block 220, we use frame to frame motion information in block 270 in analogy to FIG. 1, block 150 from the database 170, containing e.g. optical flow information 271, motion fields reused from the movie 272, distinct features and patches and their tracks 273, and individually identified objects and their trajectory/orientation 274, to name some but not all possible options.

The modalities used for previous pose estimation in block 250 are updated in block 280, either by updating the position of distinct local features and patches in block 281, or by updating the position and orientation of objects in block 282, depending on the modalities and information available in the database 170.

On successful update in block 285, the pose is refined in block 290 with the updated modalities from block 280, and the scene is augmented in block 295.

On failure to estimate a pose successfully in block 255 or to update the pose item modalities in block 285, the system may restart at 210 with a new frame and further proceeds through 220 to 230.

Figure 3:
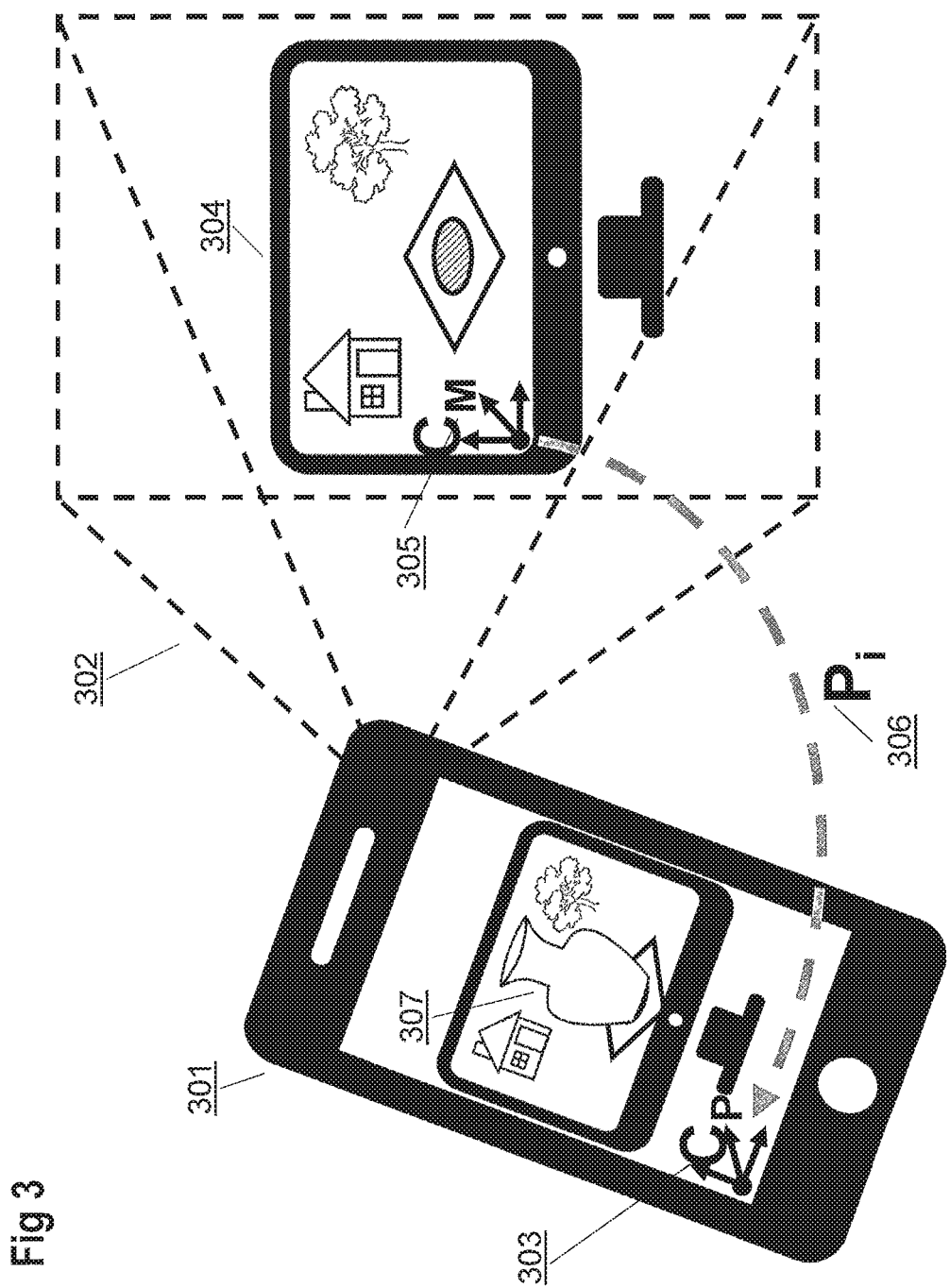
FIG. 3 illustrates the annotation on a mobile device.

In FIG. 3, an exemplary annotation of virtual information onto a live video feed on a mobile electronic device screen 301 is depicted. The mobile device observes the scene frustum 302. The large display 304 is showing a dynamic target at frame i, and the display's coordinate system 305 is given by CM. The pose Pi 306 transforms from the display's coordinate system into the coordinate system of the mobile device 303, i.e. CP. By knowing Pi, virtual content 307 can be accurately annotated and registered w.r.t. the dynamic frame shown on the large display.

Figure 4:
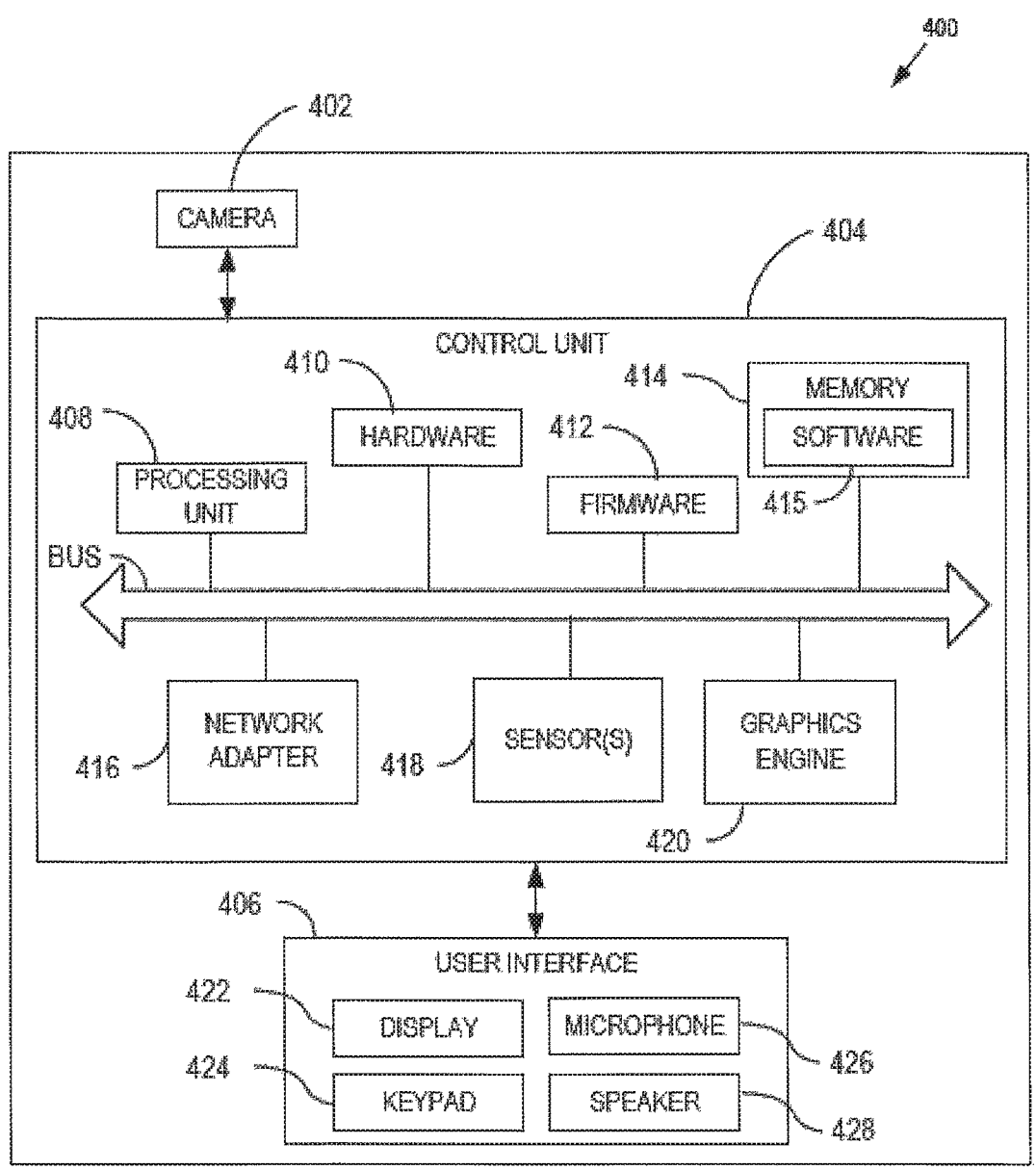
FIG. 4 illustrates the principle hardware composition of a mobile device.

FIG. 4 is a functional block diagram of a mobile device 400 capable of performing the processes discussed herein. As used herein, a mobile device 400 refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile device" may also include all electronic devices which are capable of augmented reality (AR), virtual reality (VR), and/or mixed reality (MR) applications. Any operable combination of the above are also considered a "mobile device."

Mobile device 400 may optionally include a camera 402 as well as an optional user interface 406 that includes the display 422 capable of displaying images captured by the camera 402. User interface 406 may also include a keypad 424 or other input device through which the user can input information into the mobile device 400. If desired, the keypad 424 may be obviated by integrating a virtual keypad into the display 422 with a touch sensor. User interface 406 may also include a microphone 426 and speaker 428.

Mobile device 400 also includes a control unit 404 that is connected to and communicates with the camera 402 and user interface 406, if present. The control unit 404 accepts and processes images received from the camera 402 and/or from network adapter 416. Control unit 404 may be provided by a processing unit 408 and associated memory 414, hardware 410, software 415, and firmware 412. For example, memory 414 may store instructions for processing the method described in FIG. 2 and FIG. 3 above. Memory 414 may also store the database.

Control unit 404 may further include a graphics engine 420, which may be, e.g., a gaming engine, to render desired data in the display 422, if desired. Processing unit 408 and graphics engine 420 are illustrated separately for clarity, but may be a single unit and/or implemented in the processing unit 408 based on instructions in the software 415 which is run in the processing unit 408. Processing unit 408, as well as the graphics engine 420 can, but need not necessarily include, one or more microprocessors, embedded processors, controllers, application specific integrated circuits (ASICs), digital signal processors (DSPs), and the like. In some embodiments, control unit 404 may further include sensor(s) 418 (e.g., device sensors), which may include a magnetometer, gyroscope, accelerometer, light sensor, satellite positioning system, and other sensor types or receivers. The terms processor and processing unit describes the functions implemented by the system rather than specific hardware. Moreover, as used herein the term "memory" refers to any type of computer storage medium, including long term, short term, or other memory associated with mobile device 400, and is not to be limited to any particular type of memory or number of memories, or type of media upon which memory is stored.

The processes described herein may be implemented by various means depending upon the application. For example, these processes may be implemented in hardware 410, firmware 412, software 415, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 414 and executed by the processing unit 408. Memory may be implemented within or external to the processing unit 408.

If implemented in firmware and/or software, the functions may be stored as one or more instructions or code on a computer-readable medium. Examples include non-transitory computer-readable media encoded with a data structure and computer readable media encoded with a computer program. Computer-readable media includes physical computer storage media. A storage medium may be any available medium that can be accessed by a computer. By way of example, and not limitation, such computer readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. An image processing method comprising
providing, in a device, a database comprising data derived from a sequential plurality of frames of a video;
obtaining a live video feed from a camera of the device;
extracting information from a selected image of the live video feed;
performing a search in the database based on the extracted information to retrieve a list of potential frames out of the plurality of frames;
estimating an initial pose of the selected image with respect to one frame of the list of potential frames as a function of the extracted information and the data derived from the one frame;
iteratively estimating respective subsequent poses for subsequent images from the live video feed, wherein for each of the subsequent images the associated subsequent pose is estimated based on said subsequent image and a respective previously estimated pose; and
augmenting the live video feed on the device with virtual information based on the estimated initial pose and the subsequent poses.

2. The method of claim 1, wherein estimating the initial pose comprises testing the frames of the list of potential frames for valid starting poses until the one frame is identified.

3. The method of claim 1, further comprising refining the initial pose by means of optimization as a function of the extracted information and the data derived from the one frame.

4. The method of claim 1, wherein the initial pose is estimated using two-dimensional visual correspondences between the selected image of the live video feed and the data derived from the one frame.

5. The method of claim 1, wherein the initial pose is estimated through whole image alignment and minimization of a dedicated error function.

6. The method of claim 1, wherein the data derived from the plurality of frames contain two-dimensional local visual features and their two-dimensional position for each of the plurality of frames, particularly organized in a structure for fast indexing.

7. The method of claim 1, wherein the data derived from the plurality of frames contain global appearance information for each of the plurality of frames.

8. The method of claim 1, wherein the data derived from the plurality of frames contain semantic scene descriptions.

9. The method of claim 1, wherein the plurality of frames are key frames of an MPEG movie and wherein the database further comprises motion field information for frames in between the key frames.

10. The method of claim 1, wherein the iterative estimation of the respective subsequent poses is facilitated using Optical Flow or Lucas-Kanade based tracking.

11. The method of claim 1, wherein the iterative estimation of the respective subsequent poses is facilitated considering motion undertaken by local patches associated with the extracted information.

12. The method of claim 1, wherein the pose optimization is facilitated using non-linear refinement using a reprojection error of 2D target features in an actual image plane.

13. The method of claim 1, wherein the device contains one or more device sensors including a satellite positioning system.

14. The method of claim 1, wherein the device is one of the following: a mobile phone, a tablet, a portable PC, a Head-Mounted Display, HMD, a data glass, a mobile device.

15. A mobile device comprising a processing unit, a camera and a memory, the memory holding a database comprising data derived from a sequential plurality of frames of a video and the processing unit being configured to obtain a live video feed from the camera;
extract information from a selected image of the live video feed;
perform a search in the database based on the extracted information to retrieve a list of potential frames out of the plurality of frames;
estimate an initial pose of the selected image with respect to one frame of the list of potential frames as a function of the extracted information and the data derived from the one frame;
iteratively estimate respective subsequent poses for subsequent images from the live video feed, wherein for each of the subsequent images the associated subsequent pose is estimated based on said subsequent image and a respective previously estimated pose; and
augment the live video feed with virtual information based on the estimated initial pose and the subsequent poses.

* * * * *